US008615476B2

(12) United States Patent
Berger et al.

(10) Patent No.: US 8,615,476 B2
(45) Date of Patent: Dec. 24, 2013

(54) PROTECTING MILITARY PERIMETERS FROM APPROACHING HUMAN AND VEHICLE USING BIOLOGICALLY REALISTIC NEURAL NETWORK

(75) Inventors: Theodore W. Berger, Rancho Palos Verdes, CA (US); Alireza Dibazar, Los Angeles, CA (US); Hyung O. Park, Torrance, CA (US)

(73) Assignee: University of Southern California, Los Angeles, CA (US)

( * ) Notice: Subject to any disclaimer, the term of this patent is extended or adjusted under 35 U.S.C. 154(b) by 579 days.

(21) Appl. No.: 12/759,556

(22) Filed: Apr. 13, 2010

(65) Prior Publication Data

US 2010/0268671 A1    Oct. 21, 2010

Related U.S. Application Data

(60) Provisional application No. 61/169,565, filed on Apr. 15, 2009.

(51) Int. Cl.
    *G06F 15/18* (2006.01)
(52) U.S. Cl.
    USPC .......................................................... 706/12
(58) Field of Classification Search
    USPC .................................. 706/12, 15–42, 45, 62
    See application file for complete search history.

(56) References Cited

U.S. PATENT DOCUMENTS

| 4,110,730 | A  | 8/1978  | Varecka        |
|-----------|----|---------|----------------|
| 5,021,766 | A  | 6/1991  | Genahr et al.  |
| 5,083,304 | A  | 1/1992  | Cahill         |
| 5,477,324 | A  | 12/1995 | Berthelot et al. |
| 5,774,846 | A  | 6/1998  | Morii          |
| 5,973,998 | A  | 10/1999 | Showen et al.  |
| 6,014,447 | A  | 1/2000  | Kohnen et al.  |
| 6,135,965 | A  | 10/2000 | Tumer et al.   |
| 6,643,627 | B2 | 11/2003 | Liaw et al.    |
| 6,798,715 | B2 | 9/2004  | Harmon et al.  |

(Continued)

FOREIGN PATENT DOCUMENTS

| WO | 2009046359 A2 | 4/2009 |
| WO | 2010118233 A2 | 10/2010 |

OTHER PUBLICATIONS

Automatic picking of seismic arrivals in local earthquake data using an artificial neural network, 2007, Geophysical Journal International, vol. 120, issue 3; abstract only, pp. 1-3.*

(Continued)

*Primary Examiner* — David Vincent
(74) *Attorney, Agent, or Firm* — McDermott Will & Emery LLP

(57) ABSTRACT

An approaching human threat or vehicle, such as a suicide bomber nearing a secured zone such as a military base, may be detected and classified. A vibration recognition system may detect a systematic vibration event. The entity might be a medium, human, animal, or a passenger vehicle. The system may discriminate between such an event and a background or other vibration event, such as a falling tree limb. A seismic sensor may be employed to detect vibrations generated by footsteps and a vehicle. Seismic waves may be processed locally where the sensor is located. The system may wirelessly communicate with a remote command center. Temporal features of the vibration signals may be modeled by a biologically realistic neural network with good false recognition rates. The models may reject quadrupedal animal footsteps.

20 Claims, 5 Drawing Sheets

(56) References Cited

U.S. PATENT DOCUMENTS

| | | | |
|---|---|---|---|
| 6,914,854 | B1 | 7/2005 | Heberley et al. |
| 6,944,590 | B2 | 9/2005 | Deng et al. |
| 7,203,132 | B2 | 4/2007 | Berger |
| 7,420,878 | B2 | 9/2008 | Holmes et al. |
| 7,558,156 | B2 | 7/2009 | Vook et al. |
| 2007/0120668 | A1 | 5/2007 | Boyd et al. |
| 2007/0265808 | A1* | 11/2007 | Kim .............................. 702/188 |
| 2008/0106403 | A1 | 5/2008 | Voglewede et al. |
| 2008/0234983 | A1 | 9/2008 | Leigh et al. |
| 2009/0115635 | A1 | 5/2009 | Berger et al. |
| 2009/0201146 | A1 | 8/2009 | Lundeberg |
| 2009/0309725 | A1 | 12/2009 | Berger et al. |
| 2010/0260011 | A1 | 10/2010 | Berger et al. |
| 2011/0029470 | A1* | 2/2011 | Hartmann et al. .............. 706/16 |

OTHER PUBLICATIONS

Zyl et al., Prediction of Seismic Events in Mines Using Neural Networks, 2001, IEEE, pp. 1410-1414.*

Billings, S.A. et al. 1986I Correlation Based Model Validity Tests for Nonlinear Models. International Journal of Control, 1986, vol. 44, No. 1, pp. 235-244.

Dibazar, A. A. et al. 2007. The Application of Dynamic Synapse Neural Networks on Footstep and Vehicle Recognition. Proceedings of the International Joint Conference on Neural Networks, Florida, USA, Aug. 12-17, 2007, pp. 1842-1846.

Houston, K. M. et al. 2003. Spectrum Analysis Techniques for Personnel Detection using Seismic Sensors. Proceedings of SPIE, Symposium on Unattended Ground Sensor Technologies and Applications V, SPIE, 2003, vol. 5090, pp. 162-173.

Liaw, J.-S. et al. 1996. The Dynamic Synapse: A New Concept for Neural Representation and Computation. Hippocampus, 1996, vol. 6, pp. 591-600.

Marquardt, D.W. 1963. An Algorithm for Least-Squares Estimation of Nonlinear Parameters. J. Soc. Indust. Appl. Math, Jun. 1963, vol. 11, No. 2, pp. 431-441.

Pakhomov, A. et al. 2003. A Novel Method for Footstep Detection with an Extremely Low False Alarm Rate. Proceedings of SPIE, Symposium on Unattended Ground Sensor Technologies and Applications V, 2003, SPIE 2003, vol. 5090, pp. 186-193.

Peck, L. et al. 2007. Seismic-Based Personnel Detection. Proc. 41st Annual IEEE International Carnahan Conference on Security Technology (ISBN 1-4244-1129-7), 2007, pp. 169-175.

Succi, G. et al. 2001. Footstep, Detection and Tracking. Proceedings of SPIE, Unattended Ground Sensor Technologies and Applications III, 2001, SPIE vol. 4393, pp. 22-29.

U.S. Appl. No. 12/245,575, filed Oct. 3, 2008, entitled "Acoustic Signature Recognition of Running Vehicles Using Spectro-Temporal Dynamic Neural Network," Berger et al., inventors.

International Search Report and Written Opinion, dated Mar. 17, 2009 (ISA-US), for PCT Application No. PCT/US08/078829 (Published as WO2009/046359), filed Oct. 3, 2008, entitled "Detection and Classification of Running Vehicles Based on Acoustic Signatures," Berger et al. inventors.

U.S. Appl. No. 12/763,974, filed Apr. 20, 2010, entitled "Fence Intrusion Detection," Berger et al., inventors.

International Search Report and Written Opinion, dated Oct. 27, 2010 (ISA-KIPO), for P.C.T. Application No. PCT/US2010/030394, filed Apr. 8, 2010 (Published as WO 2010/118233), entitled "Cadence Analysis of Temporal Gait patterns for Seismic Discrimination," Berger et al., inventors.

Office Action, dated Feb. 2, 2011, for U.S. Appl. No. 12/245,564, entitled "Detection and Classification of Running Vehicles Based on Acoustic Signatures," Berger et al., inventors.

Notice of Allowance, mailed Apr. 18, 2011, for U.S. Patent Application No. 12/244,549, filed Oct. 2, 2008, entitled "Systems and Methods for Security Breach Detection," Berger et al., inventors.

* cited by examiner

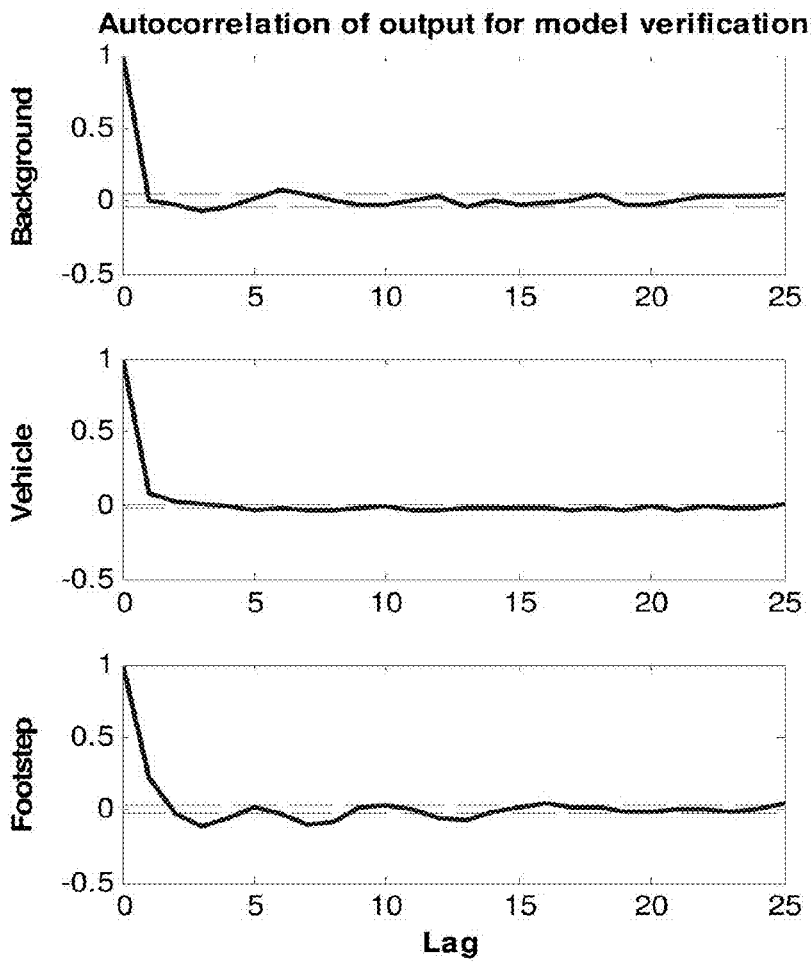
FIG. 4(A)
FIG. 4(B)
FIG. 4(C)
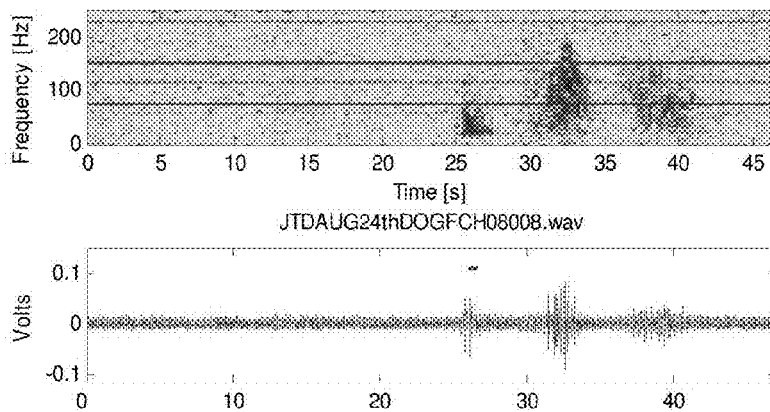
FIG. 6(A)
FIG. 6(B)

PROTECTING MILITARY PERIMETERS FROM APPROACHING HUMAN AND VEHICLE USING BIOLOGICALLY REALISTIC NEURAL NETWORK

CROSS-REFERENCE TO RELATED APPLICATIONS

This application is based upon and claims priority to U.S. Provisional Patent Application No. 61/169,565, entitled "PROTECTING MILITARY PERIMETERS FROM APPROACHING HUMAN AND VEHICLE USING BIOLOGICALLY REALISTIC DYNAMIC SYNAPSE NEURAL NETWORK," filed Apr. 15, 2009.

This application is related to U.S. Application Ser. No. 60/977,273, filed Oct. 3, 2007, entitled, "Security Breach Detection and Localization Using Vibration Sensors," and to U.S. patent application Ser. No. 12/244,549, filed Oct. 2, 2008, entitled "Systems and Methods for Security Breach Detection,". The content of both of these applications is incorporated herein by reference in its entirety.

The entire content of each of these applications and patents is incorporated herein by reference.

STATEMENT REGARDING FEDERALLY SPONSORED RESEARCH

This invention has been made with government support under Office of Naval Research (ONR) Grant No. N00014-06-1-0117, awarded by the United States Government. The government has certain rights in the invention.

BACKGROUND

1. Technical Field

This disclosure relates to security systems for protecting military and other perimeters from an approaching human and vehicle and to neural networks.

2. Description of Related Art

Perimeter protection system may be crucial to the protection of military or other assets. Detecting threats prior to the intrusion may be the first step. However, some types of detection sensors may be easily detected and disabled by intruders.

Geophones may be less conspicuous and thus less subject to disruption. The centralized processing of signals from a series of geophones has been used for detecting security breaches. See Pakhomov, A. Sicignano, M. Sandy, and T. Goldburt, "A Novel Method for Footstep Detection with an Extremely Low False Alarm Rate," in *Proc. SPIE Symposium on Unattended Ground Sensor Technologies and Applications V,* 2003, SPIE vol. 5090, pp. 186-193. Detecting human footsteps vs. other types of background vibration such as those caused by vehicles has also been suggested. See G. Succi, D. Clapp, and R. Gambert, "Footstep, Detection and Tracking," in *Proc. of the SPIE, Unattended Ground Sensor Technologies and Applications III,* 2001, SPIE vol. 4393, pp. 22-29. Kurtosis and cadence have been measured to detect footsteps. Id. Extracting cadence features using a spectrum analysis technique has also been suggested. See K. M. Houston and D. P. McGaffigan, "Spectrum Analysis Techniques for Personnel Detection using Seismic Sensors," in *Proc. SPIE Symposium on Unattended Ground Sensor Technologies and Applications V,* 2003, SPIE vol. 5090, pp. 162-173. Kurtosis has been employed to detect the event, and detection results were confirmed with cepstrum analysis to improve the results. See L. Peck and J. Lacombe, "Seismic-based personnel detection," in *Proc. 41st Annual IEEE International Carnahan Conference on Security Technology,* 2007, pp. 169-175.

Kurtosis may distinguish impulsive and rhythmic events from sustained background vibrations. However, using Kurtosis may result in confusion between footstep and similar impulsive events. The measurement of cadence may require a high signal to noise ratio. To achieve this, events may need to occur close to the sensor, which may reduce detection range. In addition, kurtosis and cadence may only be effective for footstep recognition. They may be unable to recognize vibration caused by a moving vehicle.

The performance of dynamic synapse neural networks ("DSNN") has been compared to other pattern recognition algorithms. See J-S. Liaw, and T. W. Berger, "The dynamic synapse: A new concept for neural representation and computation," *Hippocampus, vol.* 6, pp 591-600, 1996. DSNN has also been applied to the detection of a footstep and vehicle. See A. A. Dibazar, H. O. Park, and T. W. Berger, "The Application of Dynamic Synapse Neural Networks on Footstep and Vehicle Recognition," in *Proc. IEEE International Joint Conference on Neural Networks,* 2007, pp. 1842-1846.

None of these approaches, however, may be able to satisfactorily differentiate between an approaching human or vehicle, on the one hand, and quadrupedal animal footsteps or background or other noise on the other hand.

SUMMARY

A security system for protecting military and other perimeters from an approaching human or vehicle may include a seismic sensor system and a trained biologically realistic neural network system.

The seismic sensor system may be configured to sense ground vibration caused by human footsteps, a vehicle, quadrupedal animal footsteps, and other activity.

The trained biologically realistic neural network system may be configured to receive information indicative of the ground vibration sensed by the sensor system and to discriminate between ground vibration caused by each of the following based on this information: human footsteps; a vehicle; quadrupedal animal footsteps; and other activity.

The trained biologically realistic neural network system may be a trained biologically realistic dynamic neural network system.

The trained biologically realistic neural network system may include a plurality of trained biologically realistic neural networks in a parallel configuration.

The each of the plurality of trained biologically realistic neural networks may be configured to receive the information indicative of the ground vibration sensed by the sensor system.

The plurality of trained biologically realistic neural networks may include: a first trained biologically realistic neural network trained to discriminate ground vibration caused by human footsteps; a second trained biologically realistic neural network trained to discriminate ground vibration caused by a vehicle; a third trained biologically realistic neural network trained to discriminate ground vibration caused by quadrupedal animal footsteps; and a forth trained biologically realistic neural network trained to discriminate ground vibration caused by other activity.

The trained biologically realistic neural network system may be configured designate the ground vibration as being caused by the type of vibration which is being discriminated by the trained biologically realistic neural network which indicates the strongest degree of correlation with the ground vibration.

Lateral inhibition between each network's outputs may be used as part of the discrimination process.

Each trained biologically realistic neural network may be trained to predict the input.

The output of each trained biologically realistic neural network may be fed back to the input.

Each trained biologically realistic neural network may be configured to substantially implement the following algorithm:

$$O(t,\Theta) = y(t) - \hat{y}(t,\Theta)$$

where, $\Theta$ is the vector of all the weights and thresholds of the network and y is the current value of the input, hat of y is estimated input, and O is the output of each trained biologically realistic neural network.

The input output relationship of each trained biologically realistic neural network may substantially conform to the following equation:

$$\hat{y}_k(t, \Theta) = \sum_{i=1}^{n_h} w_{ki}^{(o)} a\left(\sum_{j=1}^{n_y} w_{ij}^{(h)} y_j(t) + \sum_{l=1}^{n_O} w_{il}^{(h)} O_l(t) + \mu_i^{(h)}\right)$$

where a(z) is substantially the following exponential function:

$$a(z) = \frac{1}{1 + \exp(-z)}$$

and $w_{ij}$ is the weight from node j to node i and $\mu$ is the threshold. $n_i$ is the number of nodes at layer i. Script O, y, and h mean output, input, and hidden layer respectively.

The information indicative of the ground vibration sensed by the sensor system may include temporal patterns of the vibration. The trained biologically realistic neural network system may be configured to examine the temporal patterns.

The seismic sensor system may include a plurality of seismic sensors. The trained biologically realistic neural network system may be trained to determine the location of the ground vibration sensed by the plurality of seismic sensors. The trained biologically realistic neural network system may be trained to determine the location of the sensed ground vibration based on the plurality of sensors being arranged in a grid-like pattern.

The trained biologically realistic neural network system may include a trained biologically realistic neural network system associated with each of the seismic sensors.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details which may be apparent or unnecessary may be omitted to save space or for more effective illustration. Conversely, some embodiments may be practiced without all of the details which are disclosed. When the same numeral appears in different drawings, it refers to the same or like components or steps.

FIGS. 4(A)-4(C) illustrate results of an autocorrelation test of three dynamic neural networks.

FIGS. 6(A)-6(B) illustrate an example of a dog's footstep recognition.

DETAILED DESCRIPTION OF ILLUSTRATIVE EMBODIMENTS

Figure 1:
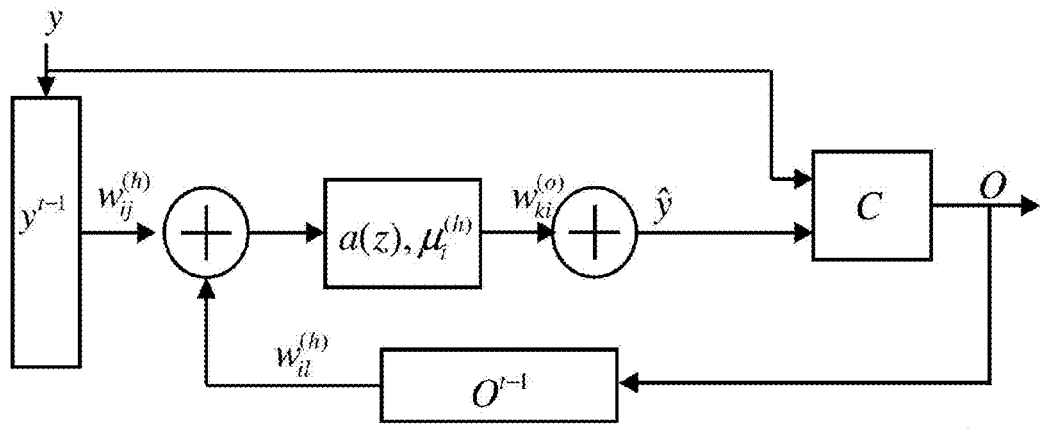
FIG. 1 illustrates an architecture for a single neural network.

Illustrative embodiments are now discussed. Other embodiments may be used in addition or instead. Details which may be apparent or unnecessary may be omitted to save space or for a more effective presentation. Conversely, some embodiments may be practiced without all of the details which are disclosed.

An algorithm may detect and discriminate vibrations caused by human footsteps and vehicles as contrasted to any background or other vibration. The algorithm may reject animal footsteps. A biologically realistic signal processing approach may be employed for this application. Biological models process temporal patterns and may provide robustness against noise.

A modified version of a Liaw-Berger dynamic synapse neural network ("DSNN") models may be used for the recognition of vehicle and human footsteps. Input signals may be encoded directly into temporal patterns with a nonlinear function. The nonlinear function may be adopted from the DSNN and may perform complicated recognition tasks by responding to only the type of vibration signals for which the system is trained. Low power, low noise, and low cost hardware may process seismic waves locally where the sensor is located. The system may wirelessly communicate with a remote command center.

A geophone may be used. The geophone may have a single axis seismometer that measures motion in the direction of its cylindrical axis. The geophone may be packaged with a conical spike and buried a few inches underground to ensure good coupling to the motion of the Earth. Ground motion may cause the hollow cylinder of the geophone to move with respect to the geophone housing. The cylinder's motion may be measured by the interaction of a coil on the cylinder with the magnetic field of a permanent magnet inside the geophone. A set of geophones may be used and may be arranged in a grid like pattern.

Faraday's law states that the voltage across a coil is equal to the change in flux through the coil with respect to time. In the case of a geophone, the change in flux through the coil versus coil displacement, $\delta(\phi)/\delta(X)$, may be constant for small displacements. Therefore, the voltage across the coil may be directly proportional to the velocity of the coil. A constant of proportionality, G [V/(m/s)] is known as the transduction constant or generator constant. G may vary by less than 0.005% as a function of position for displacements on the order of 10% of the maximum displacement.

The response of the geophone may be completely substrate dependent. Rigidity, moisture, and temperature of the substrate may alter the output signal of the geophone. Therefore it may be necessary to employ a classifier that covers all these issues.

In real neurons, the essential signal processing capability of a neuron may be derived from its capacity to change an input sequence of temporal patterns into a different, output sequence of temporal patterns. The resulting input/output transformations may be strongly nonlinear, due to nonlinear dynamics that may be inherent in the molecular mechanisms comprising neurons and their connections. Identifying the nonlinear input/output properties of neurons involved in forming memories for new patterns, and developing mathematical models of those nonlinear properties, may provide a pathway to neural-based classification.

"Dynamic synapse" neural networks (DSNNs) may be used for biologically-based pattern recognition based on incorporating experimentally-determined nonlinear dynamics of neurons in the hippocampus, the brain region responsible for forming pattern recognition memories. See J-S. Liaw, and T. W. Berger, "The dynamic synapse: A new concept for neural representation and computation," *Hippocampus*, vol. 6, pp 591-600, 1996. In this scheme, processing elements may transmit information by variation in a series of temporal patterns, and connections between processing elements may be modeled as a set of dynamic processes with different time courses of decay derived from experimental studies. These multiple time courses may determine the composite dynamics of each synaptic connection and, as a result, synaptic output may become a function of the time since past input events. Thus, each network connection may transform a sequence of input events into a different sequence of output events. DSNN is a spiking neural network which may require time domain signals to be converted to a series of spikes (action potentials) prior to actual processing in a network. Due to a lack of appropriate signal-to-spike transformation models, however, information may be lost after transformation.

The input layer of the DSNN may be modified such that it does not require spikes in the input. The new model may be a lumped model which may encode input signal directly with nonlinear modeling of temporal patterns. The modulation path of the DSNN (feedback mechanism) which adjusts output of the network may be included.

In an original DSNN, four important synaptic mechanisms namely Calcium response, facilitation I, facilitation II, and inhibition may be modeled with differential equations. For signal processing applications, time and weight scales of differential equations are adapted for a particular task. This may be considered as temporal processing of the input. The process of adaptation (or learning) is involved with finding the relationship between current and past history of input signal.

For a practical application, the network may be computationally inexpensive. To reduce the computational complexity of the network, a weighted history of the input may be employed in the pre-synapse. In addition, the feedback mechanism may be replaced by direct computation of error and its weighted history. The non-linear summation of the outputs of pre-synapse and feedback may form the post-synaptic potential. The new model may define a nonlinear function $f: R \rightarrow R$ which may generate a stream of desired output using the past history of input signal. This nonlinear function may incorporate a temporal coding capability and synaptic transmission mechanisms, including thresholding and quantal release, for generating of excitatory post-synaptic potentials (EPSPs) in the post-synapse.

FIG. 1 illustrates an architecture for a single dynamic neural network. The output of network may be trained to predict the signal as close to the input signal so that the final output O of comparator neuron C—which compares predicted value $\hat{y}$ and measured value—can be minimum. The final output may be fed through a feedback line to the input of the network to maintain the output of the comparator neuron appropriately.

The neural network may be a feed forward neural network. As illustrated in FIG. 1, the integrated weighted input may be summed with the integrated weighted output. The summation may incorporate a non-linear function. The input output relation of the network may be modeled as follows.

$$y(t) = f(y^{t-1}, O^{t-1}) + e(t) \tag{1}$$

where, y(t) is the current value of the input, $f$ is the non-linearity of the model, e is the error, $y^{t-1}$ is the past history of the input, and $O^{t-1}$ is the past history of the feedback as follows.

$$y^{t-1} = [y(t-1), y(t-2), , , y(t-n_y)] \tag{2}$$
$$= [y_1(t), y_2(t), , , y_{n_y}(t)]$$

$$O^{t-1} = [O(t-1), O(t-2), , , O(t-n_y)] \tag{3}$$
$$= [O_1(t), O_2(t), , , O_{n_y}(t)]$$

$$O(t, \Theta) = y(t) - \hat{y}(t, \Theta) \tag{4}$$

where, $\Theta$ is the vector of all the weights and thresholds of the network. y is the current value of the input, hat of y is estimated input, and O is the output of each trained biologically realistic neural network. Substitution of the non-linear summation function in (1) yields:

$$\hat{y}_k(t, \Theta) = \sum_{i=1}^{n_h} w_{ki}^{(o)} a\left(\sum_{j=1}^{n_y} w_{ij}^{(h)} y_j(t) + \sum_{l=1}^{n_O} w_{il}^{(h)} O_l(t) + \mu_i^{(h)}\right) \tag{5}$$

where a(z) is a exponential function defined as:

$$a(z) = \frac{1}{1 + \exp(-z)} \tag{6}$$

and $w_{ij}$ is the weight from node j to node i and μ is the threshold. $n_i$ is the number of nodes at layer i. Script O, y, and h mean output, input, and hidden layer respectively.

Instead of making output directly indicate whether it belongs to the target class or not, the model may be trained to estimate the input signal. The objective function may be reducing the mean square error of the estimated input and present input. Therefore, by training, the generated output of the neural network may estimate the present sample of input stream. The final stage of the neural network, i.e. comparator neuron, may have minimum firing if estimation and measured samples have become close to each other. Additionally, the feedback mechanism of DSNN may help to maintain low output firing rate.

As mentioned before, the structure of the modified DSNN may be feedforward. This may be done by embedding the feedback in the input layer. For training, the Levenberg-Marquardt method may be employed.

The update rule may be for parameters of the network that may be calculated using following equations:

$$\Theta_{i+1} = \Theta_i - (H + \lambda \mathrm{diag}[H])^{-1} d \quad (7)$$

where $$d = \langle O(t,\Theta) \nabla \hat{y}(t,\Theta_0) \rangle \quad (8)$$

$$H = \langle \nabla \hat{y}(t,\Theta_0) \nabla \hat{y}(t,\Theta_0)^T \rangle \quad (9)$$

where $\lambda$ is a number which may be updated during training. More details are at D. Marquardt, "An Algorithm for Least-Squares Estimation of Nonlinear Parameters," *SIAM J. Appl. Math*, vol. 11, pp. 164-168, 1963.

This method may blend the simple gradient descent and the quadratic approximation method. The value of $\lambda$ may be automatically increased if the output O—which may be minimized—is increasing. Increasing A may make the gradient descent component of equation (7) dominant. In reverse, if the output is decreasing, it may mean the output is getting close to the minimum point therefore $\lambda$ is decreased so that the quadratic approximation of the equation (7) to be involved. For more information about updating $\lambda$ reference D. Marquardt, "An Algorithm for Least-Squares Estimation of Nonlinear Parameters," *SIAM J. Appl. Math*, vol. 11, pp. 164-168, 1963. is recommended.

Experiments were conducted at a sandy terrain near the Joshua Tree National Park, Calif. Two geophones made by "OYO Geospace" deployed 60 feet apart from each other. For footstep recordings, four human subjects repeatedly walked through the specific paths around the geophones. The human subjects walked in the radius of 80 feet. For vehicle recordings, different types of vehicles were employed, namely a 4-cylinder compact sedan, a 6-8 cylinder SUV/pickup truck, and a diesel truck. Vehicles traveled at the speed of 15 mph and in the radius of 40-400 feet around the sensors. In addition, a trained dog's footsteps were also recorded when she was walking in the same distance of human subjects. The dog was a 3 year-old female golden retriever (50 lbs).

Two amplifiers were developed for pre-conditioning of the measured signal. A 4 channel A/D card was used to record data with 500 Hz sampling rate. The duration of recording for each trial was about 30 seconds. In total, 75 clips of background, 15 clips of dog, 47 clips of vehicle, and 106 clips of footstep were collected.

Figure 2:
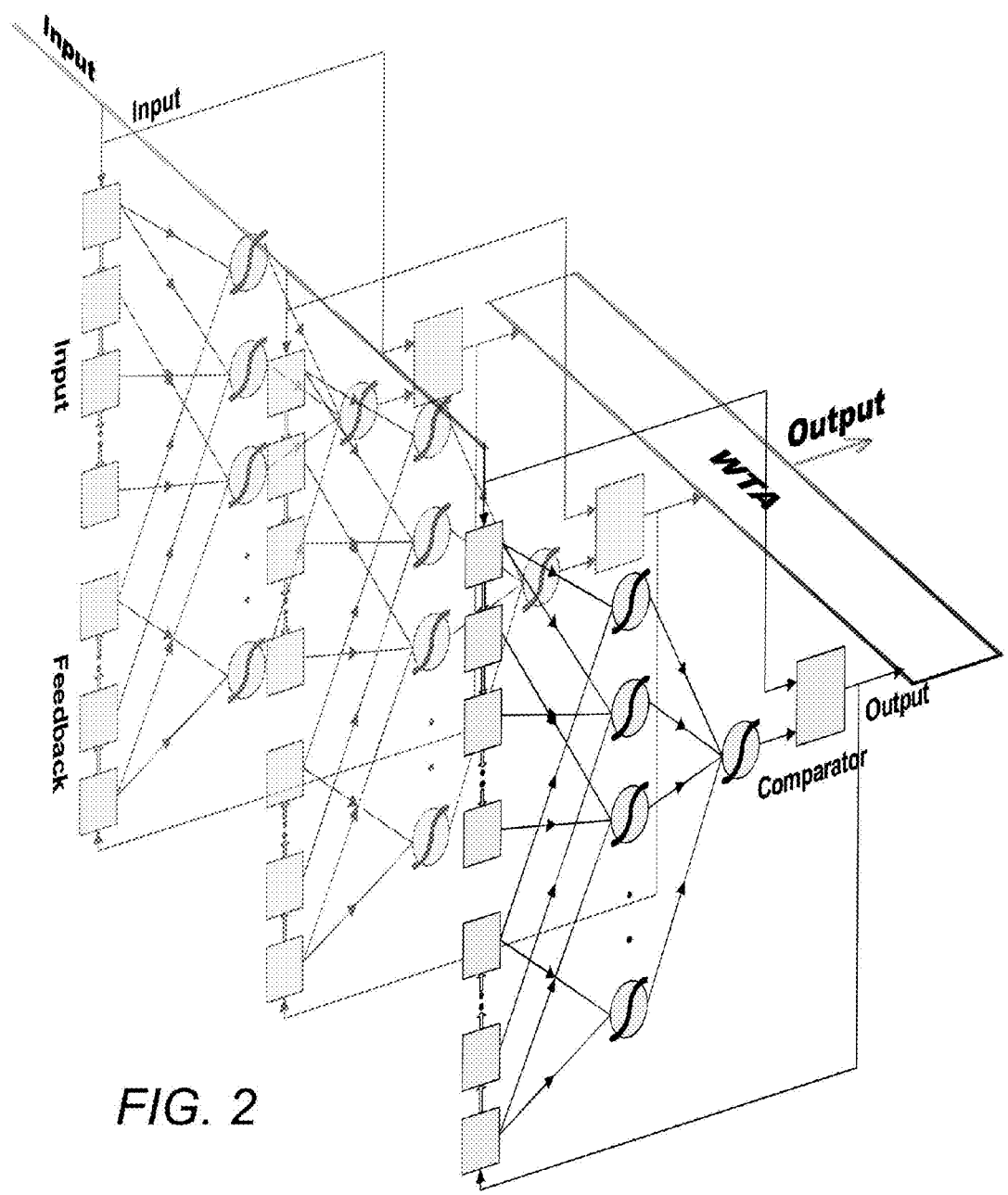
FIG. 2 illustrates an architecture for a biologically realistic neural network system which includes a plurality of dynamic synapse neural networks arranged in a parallel configuration.

FIG. 2 illustrates an architecture for a biologically realistic neural network system which includes a plurality of dynamic neural networks arranged in a parallel configuration. As illustrated in FIG. 2, three DSNNs were employed in parallel. Each DSNN unit may be the same as or different from the one shown in FIG. 1. Each output may be fed back into the input of each DSNN. One out of three outputs from each DSNN may be competitively selected through Winner-Take-All (WTA) process with lateral inhibition.

Three individual DSNNs were employed for modeling of footstep, background, and vehicles classes. The three DSNNs may be independent from each other and may work in parallel. The mathematical models of each DSNN may be exactly the same as those explained in equations one through six above and illustrated in FIG. 1. The input signal may be fed into the three already-trained DSNNs. One out of three classes may be competitively selected through a winner-take-all process with lateral inhibition.

As indicated, one DSNN structure may be trained to discriminate ground vibration for a vehicle; another trained for a footstep; and another trained for background. A fourth may be added in parallel and be of the same type as the others, except that it may be trained to discriminate ground vibration for quadrupedal animal footsteps. One or more additional DSNNs of the same type may be added in parallel and trained to recognize other vibration phenomena, such as from intermittent generator, drilling machine.

As mentioned before, three DSNNs were trained for each class, i.e. background, vehicle, and footstep. For this task, the number of input nodes was 20, and 10 for output feedback. Different numbers may be used in other systems. A hidden layer with five neurons was also employed between input and output layers. Again, a different number may be used in other systems.

Any technique may be used for training each DSNN. For example, any other gradient decent methods, evolutionary methods, simulated annealing, expectation-maximization and non-parametric methods may be used.

Figure 3A:
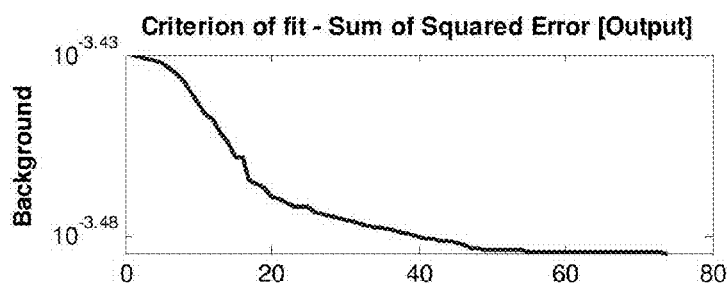
FIGS. 3(A)-3(C) are plots of mean square errors during training of three DSNNs.
Figure 3B:
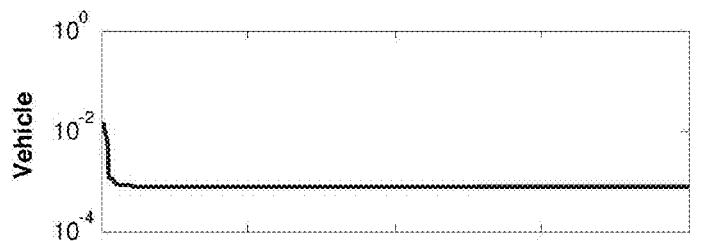
Figure 3C:
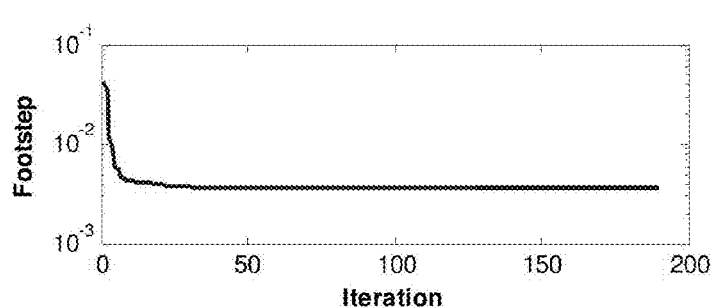

FIGS. 3(A)-3(C) are plots of mean square errors during training of each of the DSNNs. After training of the models, an autocorrelation test was performed.

FIGS. 4(A)-4(C) illustrate results of an autocorrelation test of each DSNN. The horizontal dotted lines illustrate confidence levels. A model was considered to be valid if the autocorrelation values are within the 95% confidence intervals $\pm 1.96/\sqrt{N}$.

The tests demonstrate that the models are valid. Although autocorrelation functions have not fully settled in the confidence level boundaries, they are close enough to the margins to assume that the models are valid.

Three trained DSNNs were tested with all recorded data. The goal of training was to minimize output firing rate for interclass samples and maximize the firing rate for any out of class samples. A simple threshold in the outputs of each DSNNs was used to separate in-class and out-of-class for each output.

FIGS. 5(A)-5(D) illustrate amplitude distributions of "footstep" and "vehicle" DSNNs to background, dog, human footstep, and vehicle inputs. The solid line in each figure is the distribution of normalized outputs of the DSNN for a vehicle. The dashed line is the distribution of normalized outputs of the DSNN for footsteps. The dashed vertical line is the threshold level (0.7-0.8) for rejecting background. Recognizable region for each neuron is below the threshold.

Figure 5A:
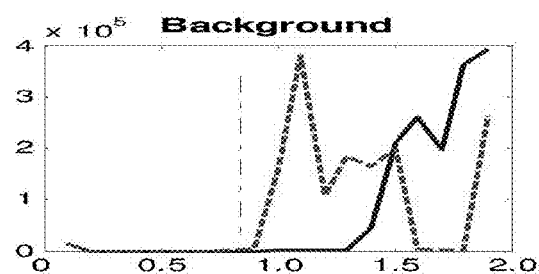
FIGS. 5(A)-5(D) illustrate amplitude distributions of "footstep" and "vehicle" dynamic neural networks compared to background, dog, human footstep, and vehicle inputs.
Figure 5B:
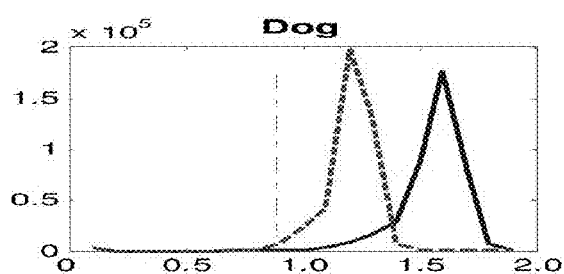

FIG. 5(A) illustrates background signals. Normalized output amplitudes of both footstep and vehicle DSNNs were above between 0.7 and 0.8 (vertical dashed line). This value was chosen as the threshold for determining whether the signal is background or not. Setting the threshold value to 0.7 may guarantee that both DSNNs will not respond to the dog's footsteps. Although a separate DSNN was trained for background, this model was not employed for detection of background. The "background" DSNN will be used to model the characteristics of other out-of-class vibrations, such as a tree limb falling to the ground.

Figure 5C:
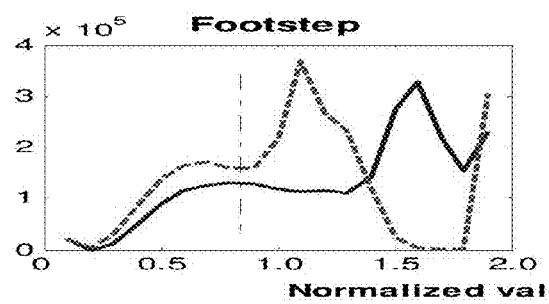
Figure 5D:
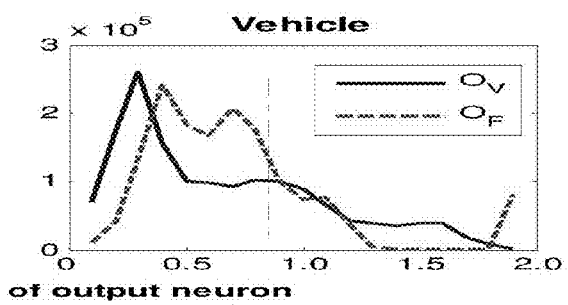

Referring to FIGS. 5(C) and 5(D)—human footstep and vehicle classes—both DSNNs showed explicit responses below the threshold level. As previously indicated, the DSNNs were trained to have a low firing rate when the input more likely belongs to the models for which they have trained.

The difference between footstep and vehicle may be due to the nature of the measured signal. The recorded vehicle data was pure vehicle signals with no background signal. The footstep data, on the other hand, had a background signal between two actual physical footsteps. That is the reason that the distribution above the threshold in footstep data was similar to the one in background data (FIG. 5(C)). Although both footstep and vehicle DSNNs revealed explicit responses below the threshold in their class, i.e. footstep and vehicle data, they may not be separable with threshold. However, it was observed that a DSNN may have a statistically lower firing rate in the signal of its class. Therefore, a Winner-Take-All (WTA) process was employed which compares two DSNNs and selects the DSNN which has the lowest firing rate, and inhibits lateral DSNNs to allow the whole network eventually to identify the class of input signal.

To evaluate the performance of recognizers, all of the recorded data were employed. The thresholds of the DSNNs for vehicle and footstep were set as 0.8 and 0.7 respectively. A few examples of the recognition results are presented in FIGS. 6 through 8.

In order to calculate the false recognition rate, every sample which was reported wrong was counted. For example, whenever footstep or vehicle class was detected during the test with background signals, the sample was counted as false recognition. It was also counted as false recognition if footstep events were detected when the actual test signal was a vehicle or visa versa. Since vehicle/footstep clips may have background signals in it, the false recognition count was divided by the total number of samples within the clip. The false recognition for vehicle clips may be named $P(F|V,B)$, $P(V|F,B)$ for the footstep clips, and $P(F,V|B)$ for the background clips, where $P(X|Y)$ means the probability of false recognizing Y as X when the actual class was Y. F, V, and B means footstep, vehicle, and background respectively. The false recognition results are shown in Table I:

TABLE I

FALSE RECOGNITION RATE FOR FOOTSTEPS AND VEHICLE

| | Data set | | | |
|---|---|---|---|---|
| | Footsteps $P(V|F, B)$ | Vehicle $P(F|V, B)$ | Background $P(F, V|B)$ | Dog $P(F, V|B)$ |
| Rate of false recog. (%) | 1.7 | 6.7 | 0.0 | 0.02 |
| # of total frames | 2476680 | 1532660 | 1488500 | 414200 |

FIGS. 6(A) and 6(B) illustrate an example of a dog's footstep recognition. The dot on top of the time domain signal in FIG. 6(A) is recognized as a human's footstep. The other dog's footsteps were correctly rejected. FIG. 6(A) is the spectrogram of the time domain signal.

Figure 7A:
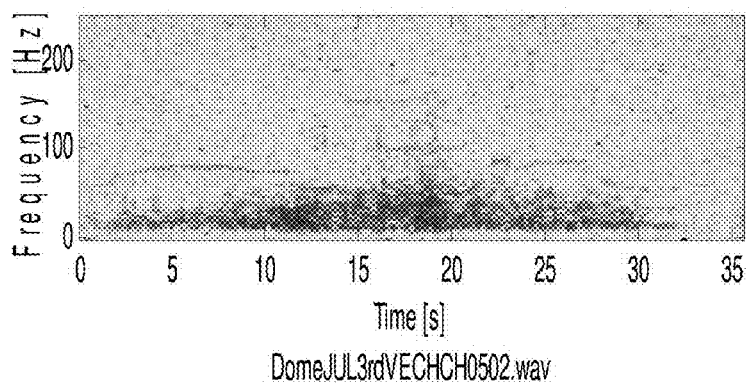
FIGS. 7(A)-7(B) illustrate an example of a vehicle recognition.
Figure 7B:
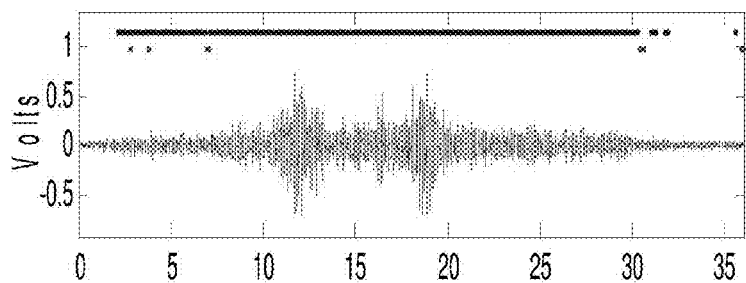

FIGS. 7(A) and 7(B) illustrate an example of vehicle recognition. The red dots on top of the time domain signal (FIG. 7(B)) are incorrect recognition results. Blue dots above the red dots are correct recognition results for vehicle. Based on this figure, the vehicle was recognizable almost everywhere on the path. It has been estimated that the reliable recognition range for vehicle was in the radius of 300 ft.

Figure 8A:
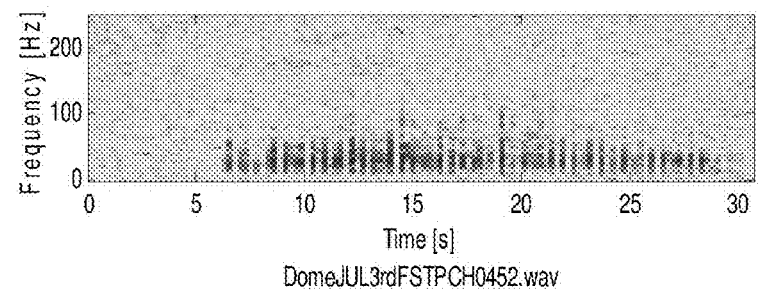
FIGS. 8(A)-8(B) illustrate normal footstep detection.
Figure 8B:
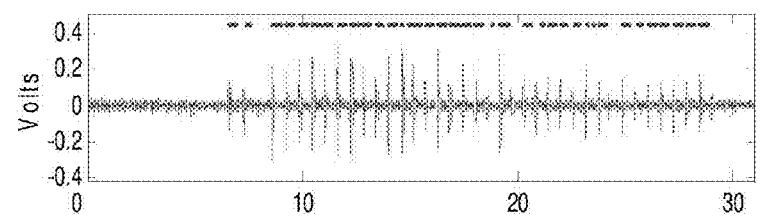

FIGS. 8(A) and 8(B) illustrate normal footstep detection. The red dots on top of the time domain signal (FIG. 8(B)) show correct recognized footsteps. There is no incorrect recognition in this clip. As shown in FIG. 8, the recognizable range was 80 ft. For softer footsteps the recognizable range reduces to 40 ft.

The application of the DSNN for protecting military assets from approaching humans or vehicle using vibration sensors has now been reviewed. New architecture of the DSNN was employed for modeling temporal response of each signal. The parallel network of DSNNs was utilized for modeling vibrations caused by background, footstep, and vehicles. The DSNNs were trained to reject four-leg animal's footsteps.

The results proved that DSNN-based human footsteps and vehicle recognizer could be used in practical situations such as protecting military assets and troops from approaching suicide bombers. One of main advantages of the proposed method is that the required hardware for mathematical computation of the DSNNs is low in cost and can be implemented simply. The hardware designed for this application was small in size which could be embedded in the sensor enclosure. When multiple sensors are used, each one may have its own set of parallel DSNNs. The fact that the expansion of the recognizer to recognize (or reject) another class of vibrations because the training is independent from the other classes is another advantage of the system. Also, very fast decision making is possible since the recognition task may require only 20 past samples (40 ms).

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

For example, although described as useful in protecting military perimeters from approaching humans and vehicles, the same technology may be used to detect approaching humans and vehicles in connection with any other security or other application with any other acoustic sensor such as microphone, hydrophone, accelerometer, and ultrasonic sensor, etc. Also any other acoustic events may be detected using the same technology.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

Nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

The invention claimed is:

1. A security system for protecting perimeters from an approaching human or vehicle comprising:

a seismic sensor system configured to sense ground vibration, including ground vibration caused by each of the following: human footsteps, a vehicle, and quadrupedal animal footsteps; and a trained biologically realistic neural network system configured to receive information indicative of the ground vibration sensed by the sensor system and to discriminate between different causes of the ground vibration based on this information, including between ground vibration caused by each of the following:

human footsteps; a vehicle; and quadrupedal animal footsteps, wherein the trained biologically realistic neural network system includes a plurality of trained biologically realistic neural networks in a parallel configuration.

2. The security system of claim 1 wherein the trained biologically realistic neural network system is a trained biologically realistic dynamic neural network system.

3. The security system of claim 1 wherein each of the plurality of trained biologically realistic neural networks is configured to receive the information indicative of the ground vibration sensed by the sensor system.

4. The security system of claim 3 wherein the plurality of trained biologically realistic neural networks includes:
a first trained biologically realistic neural network trained to discriminate ground vibration caused by human footsteps;
a second trained biologically realistic neural network trained to discriminate ground vibration caused by a vehicle;
a third trained biologically realistic neural network trained to discriminate ground vibration caused by quadrupedal animal footsteps; and
a forth trained biologically realistic neural network trained to discriminate ground vibration caused by other activity.

5. The security system of claim 4 wherein the trained biologically realistic neural network system is configured to designate the ground vibration as being caused by the type of vibration which is being discriminated by the trained biologically realistic neural network which indicates the strongest degree of correlation with the ground vibration.

6. The security system of claim 5 wherein the strongest degree of correlation is indicated by the trained biologically realistic neural network which has the lowest firing rate.

7. The security system of claim 5 wherein lateral inhibition is used as part of the discrimination process.

8. The security system of claim 1 wherein each trained biologically realistic neural network is trained to predict the input.

9. The security system of claim 8 wherein the output of each trained biologically realistic neural network is fed back to the input.

10. The security system of claim 9 wherein each trained biologically realistic neural network is configured to substantially implement the following algorithm:

$$O(t,\Theta) = y(t) - \hat{y}(t,\Theta)$$

where, $\Theta$ is the vector of all the weights and thresholds of the network and y is the current value of the input, hat of y is estimated input, and O is the output of each trained biologically realistic neural network.

11. The security system of claim 9 wherein the input output relationship of each trained biologically realistic neural network substantially conforms to the following equation:

$$\hat{y}_k(t,\Theta) = \sum_{i=1}^{n_h} w_{ki}^{(o)} a\left(\sum_{j=1}^{n_y} w_{ij}^{(h)} y_j(t) + \sum_{l=1}^{n_O} w_{il}^{(h)} O_l(t) + \mu_i^{(h)}\right)$$

where a(z) is substantially the following exponential function:

$$a(z) = \frac{1}{1+\exp(-z)}$$

and $w_{ij}$ is the weight from node j to node i and $\mu$ is the threshold $n_i$ is the number of nodes at layer i Script O, y, and h mean output, input, and hidden layer respectively.

12. The security system of claim 1 wherein:
the information indicative of the ground vibration sensed by the sensor system includes temporal patterns of the vibration; and
wherein the trained biologically realistic neural network system is configured to examine the temporal patterns.

13. The security system of claim 1 wherein:
the seismic sensor system includes a plurality of seismic sensors; and
the trained biologically realistic neural network system is trained to determine the location of the ground vibration sensed by the plurality of seismic sensors.

14. The security system of claim 13 wherein the trained biologically realistic neural network system is trained to determine the location of the ground vibration based on the plurality of sensors being arranged in a grid-like pattern.

15. The security system of claim 14 wherein the trained biologically realistic neural network system includes a trained biologically realistic neural network system associated with each of the seismic sensors.

16. A security system for protecting perimeters from an approaching human or vehicle comprising:
a seismic sensor system configured to sense ground vibration, including ground vibration caused by each of the following: human footsteps and a vehicle; and
a trained biologically realistic neural network system configured to receive information indicative of the ground vibration sensed by the sensor system and to discriminate between different causes of the ground vibration based on this information, including between ground vibration caused by each of the following:
human footsteps and a vehicle,
wherein the trained biologically realistic neural network system includes a plurality of trained biologically realistic neural networks in a parallel configuration.

17. The security system of claim 16 wherein each of the plurality of trained biologically realistic neural networks is configured to receive the information indicative of the ground vibration sensed by the sensor system.

18. The security system of claim 17 wherein the plurality of trained biologically realistic neural networks includes:
a first trained biologically realistic neural network trained to discriminate ground vibration caused by human footsteps;
a second trained biologically realistic neural network trained to discriminate ground vibration caused by a vehicle; and
a third trained biologically realistic neural network trained to discriminate ground vibration caused by the other activity.

19. The security system of claim 1 wherein the trained biologically realistic neural network system is recurrent and discrete.

20. The security system of claim 16 wherein the trained biologically realistic neural network system is recurrent and discrete.

* * * * *